United States Patent
Campbell et al.

(10) Patent No.: US 9,965,815 B1
(45) Date of Patent: May 8, 2018

(54) METHOD AND SYSTEM FOR ADVERTISING A PROPERTY UTILIZING ADVANCED REAL ESTATE SIGNS

(71) Applicants: Eric Lamont Campbell, W. Sacramento, CA (US); Richard Rodriguez, W. Sacramento, CA (US)

(72) Inventors: Eric Lamont Campbell, W. Sacramento, CA (US); Richard Rodriguez, W. Sacramento, CA (US)

( * ) Notice: Subject to any disclaimer, the term of this patent is extended or adjusted under 35 U.S.C. 154(b) by 0 days. days.

(21) Appl. No.: 15/495,656

(22) Filed: Apr. 24, 2017

(51) Int. Cl.
| | |
|---|---|
| H04N 7/15 | (2006.01) |
| G06Q 50/16 | (2012.01) |
| G06F 3/147 | (2006.01) |
| G06F 3/14 | (2006.01) |
| H04N 7/14 | (2006.01) |
| H04N 7/18 | (2006.01) |
| G09G 5/00 | (2006.01) |
| G08B 13/14 | (2006.01) |

(52) U.S. Cl.
CPC ........... *G06Q 50/165* (2013.01); *G06F 3/147* (2013.01); *G06F 3/1423* (2013.01); *G09G 5/006* (2013.01); *H04N 7/142* (2013.01); *H04N 7/183* (2013.01); *G08B 13/149* (2013.01); *G09G 2320/10* (2013.01); *G09G 2354/00* (2013.01); *G09G 2370/022* (2013.01); *G09G 2380/06* (2013.01)

(58) Field of Classification Search
None
See application file for complete search history.

(56) References Cited

U.S. PATENT DOCUMENTS

| | | | |
|---|---|---|---|
| 5,754,850 A * | 5/1998 | Janssen | G06F 17/3053 700/214 |
| 6,004,002 A | 12/1999 | Giannone | |
| 7,458,554 B1 * | 12/2008 | Levin | F16M 11/16 248/161 |
| 7,585,085 B1 * | 9/2009 | Holman | G09F 13/02 362/154 |
| 8,590,190 B2 * | 11/2013 | White | E01F 9/692 40/591 |
| 9,443,454 B1 | 9/2016 | Treece | |

(Continued)

OTHER PUBLICATIONS www.solariwaitandwatch.com/infonews-bulletin-board-en.htm. (Solar-Powered Sign).

*Primary Examiner* — Creighton Smith
(74) *Attorney, Agent, or Firm* — John P. Costello; Costello Law Corp.

(57) ABSTRACT

A method and system for advertising a property comprises a hollow elongated post, at least one rechargeable battery, at least one solar panel, a double-sided monitor, and a real estate server in communication with the double-sided monitor via a network. The real estate server resides on a central computer having a processor installed with a real estate management application and coupled with a memory unit integrated with a central database. The double-sided monitor is configured to receive a plurality of input parameters about a property and to display the details of at least one property selected by a user. The double-sided monitor includes a plurality of sensors embedded inside the monitor, a hardwire jack, a magnetic alarm, and a webcam. The double-sided monitor provides an interactive screen and allows the user to know about the property by displaying rotating images and videos.

33 Claims, 3 Drawing Sheets

(56) References Cited

U.S. PATENT DOCUMENTS

| | | | | |
|---|---|---|---|---|
| 2001/0034607 | A1* | 10/2001 | Perschbacher, III | G06Q 40/04 706/27 |
| 2002/0088157 | A1* | 7/2002 | Winterton | G09F 7/18 40/610 |
| 2006/0185203 | A1* | 8/2006 | Bittle | G09F 7/20 40/541 |
| 2008/0162575 | A1* | 7/2008 | Koulis | G06Q 10/00 |
| 2008/0312670 | A1* | 12/2008 | Lutze | A61B 17/122 606/157 |
| 2010/0180480 | A1* | 7/2010 | Mehrabi-Nejad | G06Q 30/02 40/607.01 |
| 2010/0312670 | A1* | 12/2010 | Dempsey | G06Q 30/02 705/27.2 |
| 2012/0204456 | A1* | 8/2012 | Dobson | G09F 15/0062 40/610 |
| 2017/0132729 | A1* | 5/2017 | Spencer | G06Q 50/167 |

* cited by examiner

METHOD AND SYSTEM FOR ADVERTISING A PROPERTY UTILIZING ADVANCED REAL ESTATE SIGNS

RELATED APPLICATIONS

Not Applicable.

BACKGROUND OF THE DISCLOSURE

Technical Field of the Disclosure

The present embodiment relates in general to real estate signs. More specifically, the present disclosure relates to a method and system for advertising a property utilizing an advanced real estate sign having a double-sided monitor embedded with a real estate application.

Description of the Related Art

One of the most widely used and effective means of advertising property is a real estate sign placed in a seller's yard. Conventional real estate signs provide notice to those passing by that a particular property is for sale, as well as contact information of a real estate agent or owner in charge of selling the property. However, in such systems, the real estate agent or the owner has to spend much of their day taking prospective buyers around to different homes. Many of these buyers will have the same questions about a building, such as the square foot area, lot size, school district and other typical questions. Having a way to publicly answer these questions for all interested buyers can save the real estate agent and the buyers time. People trying to sell their homes without the help of a real estate agent can miss potential buyers when at work or away from their home. By having the information such as the video of the property or a live chat or voice call with a real estate agent/owner readily available to interested parties may help reduce the amount of missed opportunities that can occur.

Different varieties of sign systems are currently available. One such system provides a lighted real estate sign and method for marketing real estate. The lighted real estate sign includes at least one translucent face with indicia to convey marketing information pertaining to the property. However, the marketing information on the translucent face can only indicate if the real estate is available for sale or lease and fails to provide more information about the property.

Another existing system provides a portable illuminated real estate sign system having a carrying case, a sign, and a post. This sign is attached to a detachable post that has an anti-theft device; can be single or double-sided with a weatherproof casing and a solar panel to charge at least one rechargeable battery; and contains a energizing light source to be turned on by a light sensor from dusk till dawn. However, is this system only provides information about a real estate company's name, telephone number(s), broker's or agent's name, and other related information and does not provide video or rotating images.

Certain existing systems provide a real estate sign support assembly having a housing with an external surface, the housing defining a horizontal cross-arm configured to support a real estate sign and at least one controller coupled to at least one of a plurality of color-changing light-sources. However, this system does not include a digital software technology capable of displaying rotating images and does not provide a video camera for a live chat or voice call with a real estate agent.

Therefore, there is a need for a method and system that would provide advanced real estate signs having a double-sided monitor embedded with a real estate application. Such a method and system would provide details about the property, such as the square foot area, lot size, school district and other such information. Such a system and method would provide video or rotating images of the property. This system would also contain a webcam attached to each side of the double-sided monitor and a magnetic alarm to prevent theft. Such a system and method would have a real estate management application that provides an interactive touch screen that allows the user take a virtual tour of the property by displaying rotating images and videos. Such a system and method would also work in conjunction with an existing surveillance system additional protection from theft. Such a system would provide a magnetic alarm that alerts a tracking system to protect against theft; provides multi-language audio capabilities and allow instant communication between a user and the real estate agent. The present invention overcomes the existing shortcomings in this area by accomplishing these objectives.

SUMMARY OF THE DISCLOSURE

To minimize the limitations found in the existing systems and methods, and to minimize other limitations that will be apparent upon the reading of the specifications, preferred embodiment of the present invention provides a method and system for advertising a property utilizing an advanced real estate sign system having a double-sided monitor embedded with a real estate application.

The real estate sign system comprises a hollow elongated post, at least one rechargeable battery, at least one solar panel, a double-sided monitor, and a real estate server. The hollow elongated post includes a top end and a bottom end. A plurality of retractable legs is positioned at the bottom end of the hollow elongated post and a horizontal member is positioned proximate to the top end of the hollow elongated post. The hollow elongated post is adaptable to fix on a flat surface utilizing the plurality of retractable legs. The at least one rechargeable battery is positioned inside the hollow elongated post proximate the bottom end and the at least one solar panel is positioned on the top end of the hollow elongated post. The double-sided monitor is attached to the horizontal member of the hollow elongated post utilizing a plurality of connecting means. The double-sided monitor is configured to receive a plurality of input parameters about the property and to display the details of at least one property selected by a user. The double-sided monitor includes a plurality of sensors embedded inside the monitor, a hard-wire jack, a magnetic alarm, and a webcam. The hard-wire jack and the magnetic alarm are attached to one end of the double-sided monitor. The webcam is attached to each side of the double-sided monitor. The magnetic alarm is in communication with the double-sided monitor.

The real estate server is in communication with the double-sided monitor via a network. The real estate server resides on a central computer having a processor installed with a real estate management application and coupled with a memory unit integrated with a central database. The real estate server comprises an input storage module, an activation module, a display module, an audio-video module, a language selection module, and a call enhancement module located at the processor. The input storage module is configured to store the plurality of input parameters about the property provided by the user. The activation module is configured to activate the webcam attached to each side of the double-sided monitor based on the signals from the plurality of sensors when the user approaches the double-sided monitor. The display module is configured to display the plurality of input parameters on request by the user. The audio-video module is configured to provide audio and video images of the plurality of input parameters on request by the user. The language selection module is configured to allow the user to select a particular language of interest. The call enhancement module is configured to provide video call with at least one real estate agent by the user. The double-sided monitor in communication with the real estate server installed with the real estate management application provides an interactive screen and allows the user to know about the property by displaying rotating images and videos.

The method for advertising the property utilizing an advanced real estate sign system, comprises the step of: providing the advanced real estate sign system comprising a hollow elongated post, at least one rechargeable battery, a double-sided monitor having a plurality of sensors, a hard-wire jack attached to one end of the double-sided monitor, a webcam attached to each side of the double-sided monitor and a magnetic alarm, at least one solar panel configured to power the double-sided monitor and a real estate server in communication with the double-sided monitor via a network. Then installing a real estate management application in the real estate server in communication with the double-sided monitor. Providing a plurality of input parameters to an input storage module located at the processor of the real estate server installed with the real estate management application through the double-sided monitor by a user. Then activating the webcam based on the plurality of sensors by an activation module located at the processor of the real estate server, when the user approaches the double-sided monitor. Selecting at least one property displayed on the double-sided monitor by the user. Activating an audio-video module located at the processor of the real estate server to provide audio and video images of at least one property requested by the user. Then displaying the plurality of input parameters by a display module located at the processor of the real estate server, on request by the user. Activating a language selection module located at the processor of the real estate server to allow the user to select a particular language of interest and activating a call enhancement module located at the processor of the real estate server to allow video call with at least one real estate agent by the user.

A first objective of the present invention is to provide a method and system that would provide advanced real estate signs having a double-sided monitor embedded with a real estate application.

A second objective of the present invention is to provide a method and system that would provide details about the property, such as the square foot area, lot size, school district and other such information.

A third objective of the present invention is to provide a system and method that would provide video or rotating images of the property.

A fourth objective of the present invention is to provide a system that would contain a webcam attached to each side of the double-sided monitor and a magnetic alarm to prevent theft.

A fifth objective of the present invention is to provide a system and method that would have a real estate management application that provides an interactive touch screen that allows the user take a virtual tour of the property by displaying rotating images and videos.

A sixth objective of the present invention is to provide a system and method that would work in conjunction with an existing surveillance system additional protection from theft.

Another objective of the present invention is to provide a system that would provide a magnetic alarm that alerts a tracking system to protect against theft; provides multi-language audio capabilities and allow instant communication between a user and the real estate agent.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
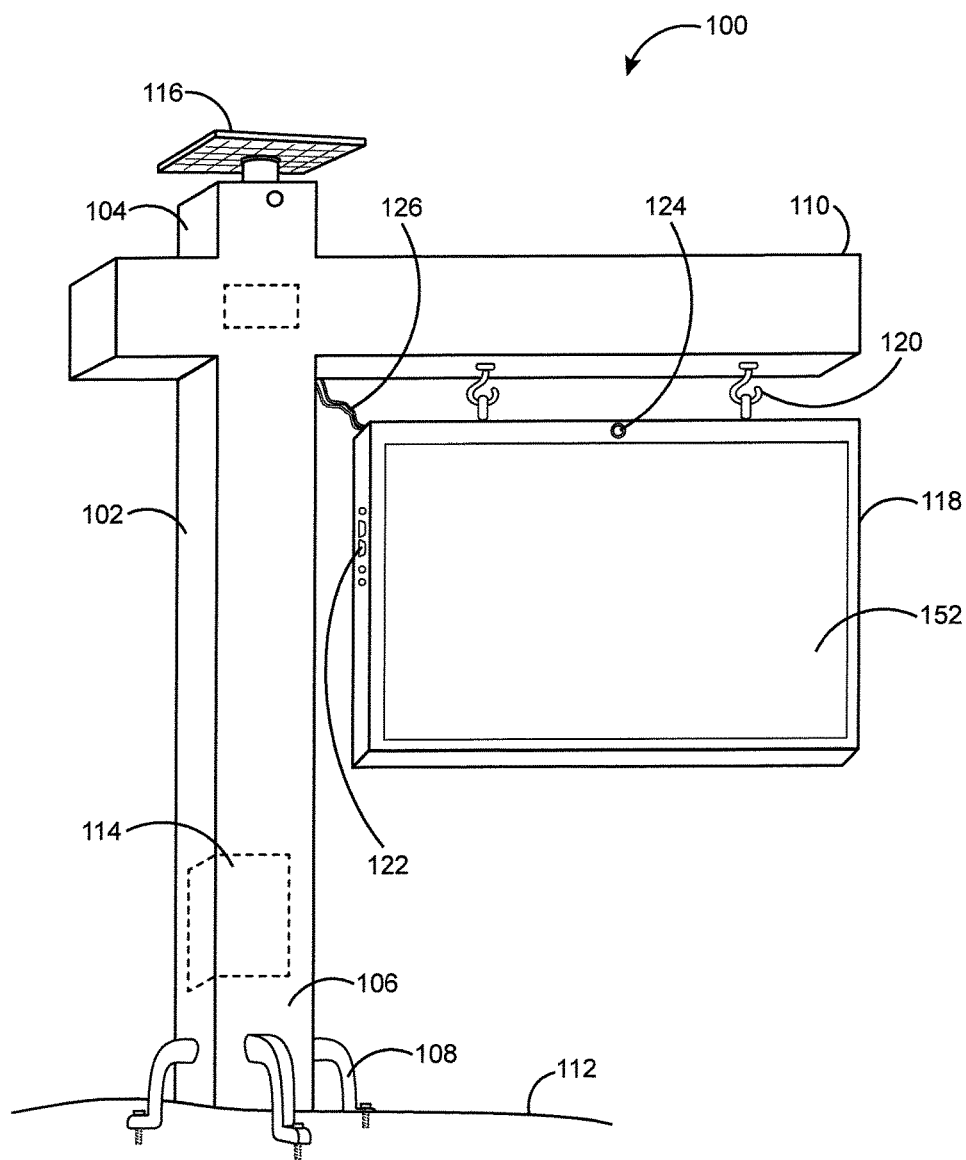
FIG. 1 illustrates a perspective view of an advanced real estate sign system for advertising a property in accordance with the preferred embodiment of the present invention.
Figure 2:
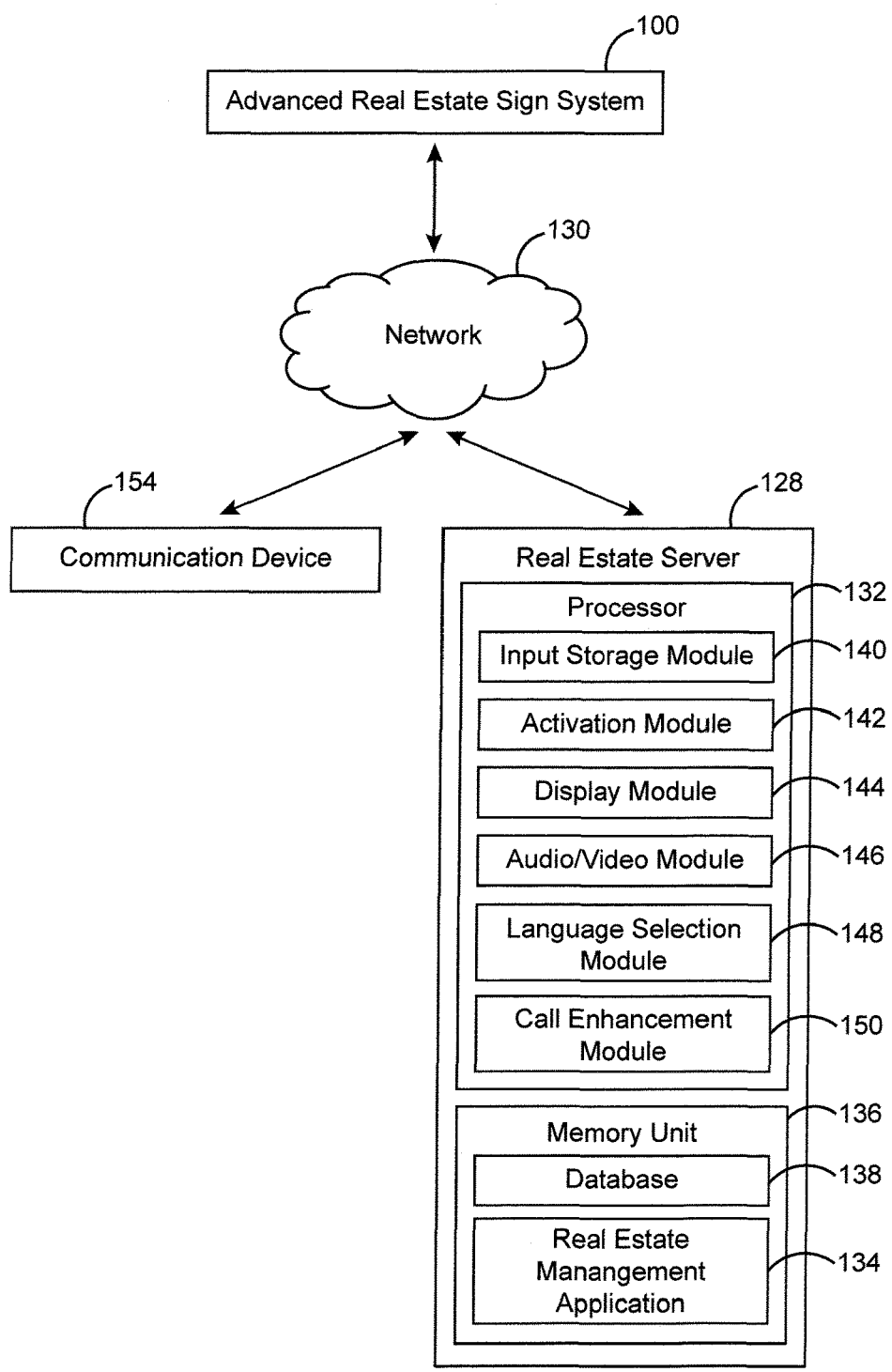
FIG. 2 illustrates a block diagram of the system for advertising the property utilizing the advanced real estate sign system in accordance with the preferred embodiment of the present invention.

Referring to FIGS. 1-2, a perspective view of an advanced real estate sign system 100 for advertising a property in accordance with the preferred embodiment of the present invention is illustrated in FIG. 1. The real estate sign system 100 comprises a hollow elongated post 102, at least one rechargeable battery 114, at least one solar panel 116, a double-sided monitor 118 and a real estate server 128. The hollow elongated post 102 includes a top end 104 and a bottom end 106. A plurality of retractable legs 108 is positioned at the bottom end 106 of the hollow elongated post 102 and a horizontal member 110 is positioned proximate to the top end 104 of the hollow elongated post 102. The hollow elongated post 102 is adaptable to fix on a flat surface 112 utilizing the plurality of retractable legs 108.

The plurality of retractable legs 108 allows the system 100 to position on any flat surface 112, such as for example, on road side where passersby can get down and have a look or on areas where so many people gather such on shopping malls, parks etc. The at least one rechargeable battery 114 is positioned inside the hollow elongated post 102 proximate the bottom end 106 and the at least one solar panel 116 is positioned on the top end 104 of the hollow elongated post 102. The double-sided monitor 118 is attached to the horizontal member 110 of the hollow elongated post 102 utilizing a plurality of connecting means 120. The plurality of connecting means 120 can be hooks. The double-sided monitor 118 is configured to receive a plurality of input parameters about the property and to display the details of at least one property selected by a user. The displayed details can be read by the user even in the sunlight. The advance real estate sign system 100 is made from a waterproof or weatherproof material which makes the system 100 to be installed anywhere without damage. The plurality of input parameters can be details relating the property such as square foot area, lot size, nearby schools, and other nearby landmarks. The double-sided monitor 118 is solar powered by the at least one solar panel 116 positioned on the top end 104 of the hollow elongated post 102. The double-sided monitor 118 includes a plurality of sensors (not shown) embedded inside the monitor 118, a hard-wire jack 122, a magnetic alarm 126 and a webcam 124. The double-sided monitor 118 functions as an interactive screen 152 that displays information about the property that the user has selected. The main function of the double-sided monitor 118 can be utilized from dawn to dusk and afterward the monitor 118 may display the details of the company that has installed the system 100 in the area. The double-sided monitor 118 also provides audio and video capabilities and has option to change the language of the details of the property viewed. The hard-wire jack 122 and the magnetic alarm 126 are attached to one end of the double-sided monitor 118. The hard-wire jack 122, for example, can be a 110-volt jack which can be plugged into an electric outlet in case of an emergency, like a shortage of solar power. The plurality of sensors (not shown) is motion sensors. The webcam 124 is attached to each side of the double-sided monitor 118 and are motion sensory activated webcams. The motion sensors embedded on the double-sided monitor 118 activate the webcam 124 when the user approaches the double-sided monitor 118. The plurality of sensors activates the webcam 124 and work in conjunction with a surveillance system (not shown) to protect the community where the system 100 is positioned and to protect the system 100 from theft and reduce the chance of vandalism and damage.

The magnetic alarm 126 is in communication with the double-sided monitor 118. When a thief tries to snatch the double-sided monitor 118, the magnetic alarm 126 alerts and prevents theft of the system 100. The magnetic alarm 126 alerts a tracking system (not shown) to protect against theft. The tracking system can, preferably be, a global positioning system (GPS) installed in the double-sided monitor 118 to prevent theft.

The real estate server 128 is in communication with the double-sided monitor 118 via a network 130 as illustrated in FIG. 2. The network 130 is a data communication network selected from a group consisting of: Internet, a local area network (LAN), a wide area network (WAN), wired Ethernet, wireless Ethernet, and cellular wireless network. The real estate server 128 resides on a central computer (not shown) having a processor 132 installed with a real estate management application 134 and coupled with a memory unit 136 integrated with a central database 138. The real estate server 128 comprises an input storage module 140, an activation module 142, a display module 144, an audio-video module 146, a language selection module 148 and a call enhancement module 150 located at the processor 132. The input storage module 140 is configured to store the plurality of input parameters about the property provided by the user. The activation module 142 is configured to activate the webcam 124 attached to each side of the double-sided monitor 118 based on the signals from the plurality of sensors (not shown) when the user approaches the double-sided monitor 118. The display module 144 is configured to display the plurality of input parameters on request by the user. The audio-video module 146 is configured to provide audio and video images of the plurality of input parameters on request by the user. The language selection module 148 is configured to allow the user to select a particular language of interest. The call enhancement module 150 is configured to provide a video call with at least one real estate agent by the user. The double-sided monitor 118 in communication with the real estate server 128 installed with the real estate management application 134 provides an interactive screen 152 and allows the user to know about the property by displaying rotating images and videos. The system 100 provides a multimedia sign that provides video and multi-language audio capabilities and allows instant communication between the user and the at least one real estate agent. The system 100 is interactive and provides instant information about the property with the help of pictures, video and also through live chat or video call to real estate agents.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor, except for a transitory, propagating signal. The computer program product disclosed herein comprises one or more computer program codes for advertising the property utilizing the advanced real estate sign system 100.

In one embodiment, the user can provide or update the plurality of input parameters to the system 100 and can also control the system 100 via the network 130 through at least one communication device 154. The at least one communication device 154 can be selected from a group consisting of: a wireless-enabled personal digital assistant, a cellular telephone, a smartphone, a tablet, a personal computer, a notebook, and a mobile device. The double-sided monitor 118 is a touch screen that allows the user to take a virtual tour through property and the accompanying land. The real estate management application 134 installed in the double-sided monitor 118 allows it to show the video, images and other items regarding the property on the market. The system 100 allows vocal interaction of possible buyers with at least one real estate agent through a call button (not shown) is provided by the real estate application 134 to get more information about the property. A panic button (not shown) is also provided by the real estate application 134 to alert emergency services if a problem or crisis is to occur at or near the property that is for sale. The dimension of the real estate sign system 100 can vary depending upon the functional uses of the system 100.

In one embodiment, the real estate server 128 provides a website for managing or controlling the plurality of inputs regarding the details of the property and the user can input the plurality of inputs through the at least one communication device 154. The user can provide plurality of input parameters such as square foot area, lot size, nearby schools, and other nearby landmarks. The website enables the user to create an account for inputting the plurality of inputs. The plurality of inputs may include images, text, and videos of the property to provide the user with a virtual tour about the property.

Figure 3:
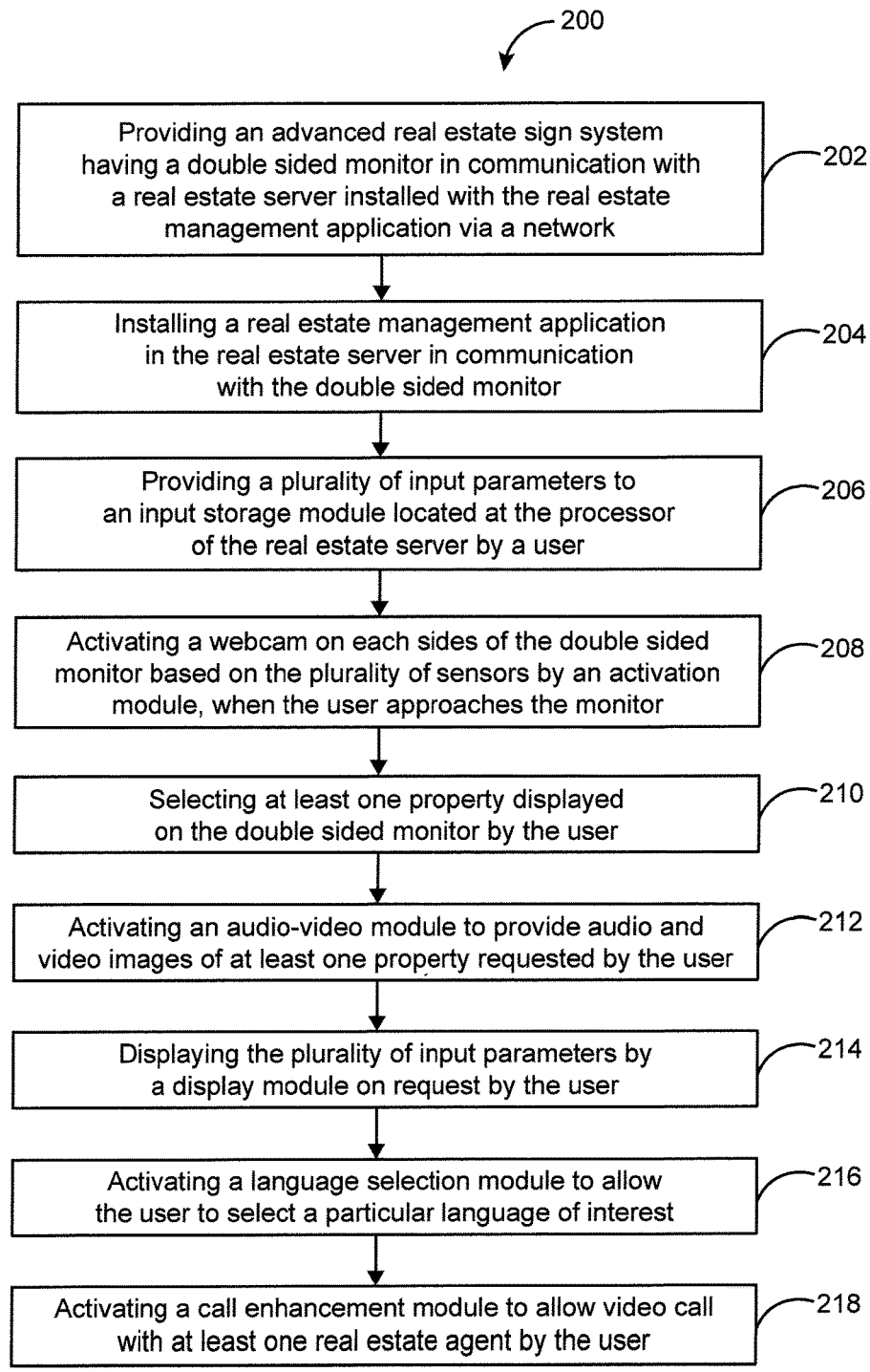
FIG. 3 illustrates a flowchart of a method for advertising the property utilizing the advanced real estate sign system in accordance with the preferred embodiment of the present invention.

FIG. 3 illustrates a flowchart of a method for advertising the property 200 utilizing the advanced real estate sign system 100 in accordance with the preferred embodiment of the present invention. The method for advertising the property 200 utilizing an advanced real estate sign system, comprises the step of: providing the advanced real estate sign system comprising a hollow elongated, at least one rechargeable battery, a double-sided monitor having a plurality of sensors, a hard-wire jack attached to one end of the double-sided monitor, a webcam attached to each side of the double-sided monitor and a magnetic alarm, at least one solar panel configured to power the double-sided monitor and a real estate server in communication with the double-sided monitor via a network as indicated in block 202. Then installing a real estate management application in the real estate server in communication with the double-sided monitor as indicated in block 204. As indicated in block 206, providing a plurality of input parameters to an input storage module located at the processor of the real estate server installed with the real estate management application through the double-sided monitor by a user. Then activating the webcam based on the plurality of sensors by an activation module located at the processor of the real estate server, when the user approaches the double-sided monitor as indicated in block 208. Selecting at least one property displayed on the double-sided monitor by the user as indicated in block 210. As indicated in block 212, activating an audio-video module located at the processor of the real estate server to provide audio and video images of at least one property requested by the user. Then displaying the plurality of input parameters by a display module located at the processor of the real estate server, on request by the user as indicated in block 214. Activating a language selection module located at the processor of the real estate server to allow the user to select a particular language of interest as indicated in block 216 and activating a call enhancement module located at the processor of the real estate server to allow video call with at least one real estate agent by the user as indicated in block 218.

The advanced real estate sign system 100 can be used by real estate agents, brokers and also for sale by owners. The advanced real estate sign system 100 provides instant communication with at least one real estate agent. This system 100 provides instant updated information about the property, a 24/7 real estate agent onsite to promote the sale of the property. Thus, the present system 100 will free the real estate agent's time by showing the video of the property and if prospective buyers are interested they can contact the real estate agent to get more information.

The flowcharts and block diagrams in the figures illustrate the s architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An advanced real estate sign system, comprising:
 a hollow elongated post having a top end, a bottom end, a plurality of retractable legs positioned at the bottom end and a horizontal member positioned proximate the top end, the hollow elongated post adaptable to fix on a flat surface utilizing the plurality of retractable legs;
 at least one rechargeable battery positioned inside and proximate the bottom end of the hollow elongated post;
 at least one solar panel positioned on the top end of the hollow elongated post;
 a double-sided monitor attached to the horizontal member of the hollow elongated post utilizing a plurality of connecting means, the double-sided monitor configured to receive a plurality of input parameters about a property and to display the details of at least one property selected by a user, the double-sided monitor includes a plurality of sensors embedded inside the monitor, a hard-wire jack attached to one end of the double-sided monitor, a webcam attached to each side of the double-sided monitor and a magnetic alarm in communication with the double-sided monitor; and
 a real estate server in communication with the double-sided monitor via a network, the real estate server residing on a central computer having a processor installed with a real estate management application and coupled with a memory unit integrated with a central database, the real estate server comprising:
  an input storage module, at the processor, being configured to store the plurality of input parameters about the property provided by a user;
  an activation module, at the processor, being configured to activate the webcam based on the plurality of sensors when a user approach the double-sided monitor;
  a display module, at the processor, being configured to display the plurality of input parameters on request by a user;
  an audio-video module, at the processor, being configured to provide audio and video images of the plurality of input parameters on request by a user;
  a language selection module, at the processor, being configured to allow a user to select a particular language; and
  a call enhancement module, at the processor, being configured to provide video call with at least one real estate agent by a user;
 whereby the double-sided monitor in communication with the real estate server installed with the real estate management application provides an interactive screen and allows a user to know about the property by displaying rotating images and videos.

2. The system of claim 1, wherein the double-sided monitor is solar powered by the at least one solar panel positioned on the top end of the hollow elongated post.

3. The system of claim 1, wherein the plurality of input parameters can be details relating the property such as square foot area, lot size, nearby schools and other nearby landmarks.

4. The system of claim 1, wherein the plurality of sensors are motion sensors.

5. The system of claim 1, wherein the webcam attached to each side of the double-sided monitor is a motion sensory activated webcam.

6. The system of claim 1, wherein the plurality of sensors activates the webcam and work in conjunction with a surveillance system to protect a community where the system is positioned and to protect the system from theft.

7. The system of claim 1, wherein the system is accessible and can be controlled through the network by at least one communication device selected from a group consisting of: a wireless-enabled personal digital assistant, a cellular telephone, a smartphone, a tablet, a personal computer, a notebook and a mobile device.

8. The system of claim 7, wherein the network is a data communication network selected from a group consisting of: Internet, a local area network (LAN), a wide area network (WAN), wired Ethernet, wireless Ethernet and cellular wireless network.

9. The system of claim 1, wherein the double-sided monitor provides a virtual tour for a user through property and accompanying land.

10. The system of claim 1, wherein the double-sided monitor is a touch screen that allows a user to take virtual tour through property and accompanying land.

11. The system of claim 1, wherein the magnetic alarm alerts a tracking system to protect against theft.

12. The system of claim 11, wherein the tracking system is a global positioning system (GPS) installed in the double-sided monitor and the hollow elongated post to prevent theft.

13. The system of claim 1, wherein the hard-wire jack attached to one end of the double-sided monitor can be plugged into an electric outlet in case of an emergency like shortage of solar power.

14. The system of claim 1, wherein the system provides video and multi-language audio capabilities.

15. The system of claim 1, wherein the system allows instant communication between a user and the at least one real estate agent.

16. A method for advertising a property utilizing an advanced real estate sign system, the method comprising the steps of:
 a) providing the advanced real estate sign system comprising a hollow elongated post, at least one rechargeable battery, a double-sided monitor having a plurality of sensors, a hard-wire jack attached to one end of the double-sided monitor, a webcam attached to each side of the double-sided monitor and a magnetic alarm, at least one solar panel configured to power the double-sided monitor and a real estate server in communication with the double-sided monitor via a network;
 b) installing a real estate management application in a real estate server in communication with the double-sided monitor;
 c) providing a plurality of input parameters to an input storage module located at a processor of the real estate server installed with the real estate management application through the double-sided monitor by a user;
 d) activating the webcam attached to each side of the double-sided monitor based on the plurality of sensors by an activation module located at the processor of the real estate server, when a user approaches the double-sided monitor;
 e) selecting at least one property displayed on the double-sided monitor by a user;
 f) activating an audio-video module located at the processor of the real estate server to provide audio and video images of at least one property requested by a user;
 g) displaying the plurality of input parameters by a display module located at the processor of the real estate server, on request by a user;
 h) activating a language selection module located at the processor of the real estate server to allow a user to select a particular language of interest; and
 i) activating a call enhancement module located at the processor of the real estate server to allow video call with at least one real estate agent by a user.

17. The method of claim 16, wherein the plurality of input parameters can be details relating the property such as square foot area, lot size, nearby schools and other nearby landmarks.

18. The method of claim 16, wherein the double-sided monitor is solar powered by the at least one solar panel positioned on the hollow elongated post.

19. The method of claim 16, wherein the webcam attached to each side of the double-sided monitor is a motion sensory activated webcam.

20. The method of claim 16, wherein the plurality of sensors activate the webcam and work in conjunction with a surveillance system to protect a community where the system is positioned and to protect the system from theft.

21. The method of claim 16, wherein the double-sided monitor is a touch screen that allows a user to take virtual tour through property and accompanying land.

22. The method of claim 16, wherein the magnetic alarm alerts a tracking system such as a global positioning system (GPS) to protect against theft.

23. The method of claim 16 further comprising providing video and multi-language audio capabilities and allowing instant communication between a user and the at least one real estate agent.

24. A computer program product comprising computer executable instructions embodied in a non-transitory computer readable storage medium having a computer readable program code embodied therein, the computer readable program code configured to be executed on a computer system to implement a method for advertising a property with details utilizing an advanced real estate sign system, the method comprising the steps of:
 a) installing a real estate management application in a real estate server in communication with a double-sided monitor;
 b) providing a plurality of input parameters to an input storage module located at a processor of the real estate server installed with the real estate management application through the double-sided monitor by a user;
 c) activating a webcam attached to each side of the double-sided monitor based on a plurality of sensors by activation module, at the processor of the real estate server, when a user approaches the double-sided monitor;
 d) selecting at least one property displayed on the double-sided monitor by a user;

e) activating an audio-video module located at the processor of the real estate server to provide audio and video images of at least one property requested by a user;

f) displaying the plurality of input parameters by a display module located at the processor of the real estate server, on request by a user;

g) activating a language selection module located at the processor of the real estate server to allow a user to select a particular language of interest; and h) activating a call enhancement module located at the processor of the real estate server to allow video call with at least one real estate agent by a user.

25. The computer program product of claim 24, wherein the plurality of input parameters can be details relating the property such as square foot area, lot size, nearby schools and other nearby landmarks.

26. The computer program product of claim 24, wherein the double-sided monitor is solar powered by the at least one solar panel positioned on a hollow elongated post.

27. The computer program product of claim 24, wherein the webcam attached to each side of the double-sided monitor are motion sensory activated webcam.

28. The computer program product of claim 24, wherein the plurality of sensors activate the webcam and work in conjunction with a surveillance system to protect a community where the system is positioned and to protect the system from theft.

29. The computer program product of claim 24, wherein the double-sided monitor is a touch screen that allows a user to take a virtual tour through property and accompanying land.

30. The computer program product of claim 24, wherein the magnetic alarm alerts a tracking system such as a global positioning system (GPS) to protect against theft.

31. The computer program product of claim 24, further providing video and multi-language audio capabilities and allowing instant communication between a user and the at least one real estate agent.

32. The computer program product of claim 24, wherein said real estate server is in communication with the double-sided monitor via a network.

33. The computer program product of claim 32, wherein the network is a data communication network selected from a group consisting of: Internet, a local area network (LAN), a wide area network (WAN), wired Ethernet, wireless Ethernet and cellular wireless network.

\* \* \* \* \*